Aug. 25, 1959     G. A. SCHERRY     2,900,662
MOLDING MACHINE
Filed Sept. 1, 1955     4 Sheets-Sheet 1
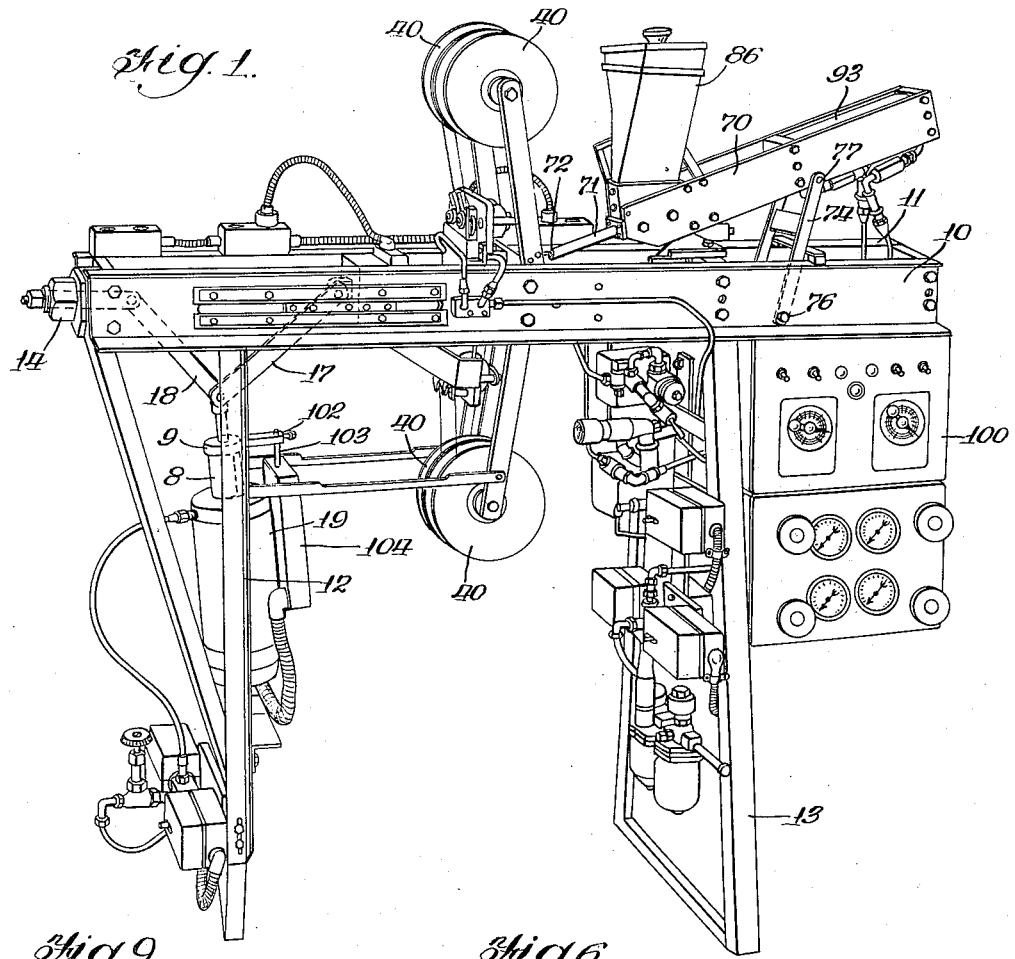
Fig. 1.
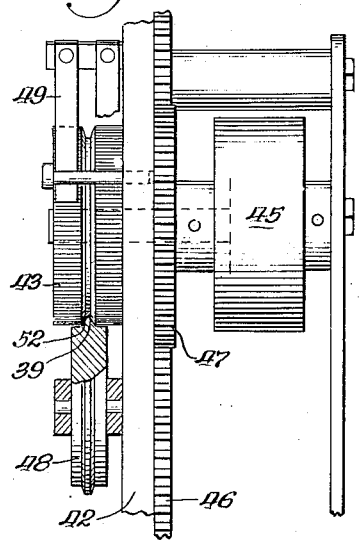
Fig. 9.
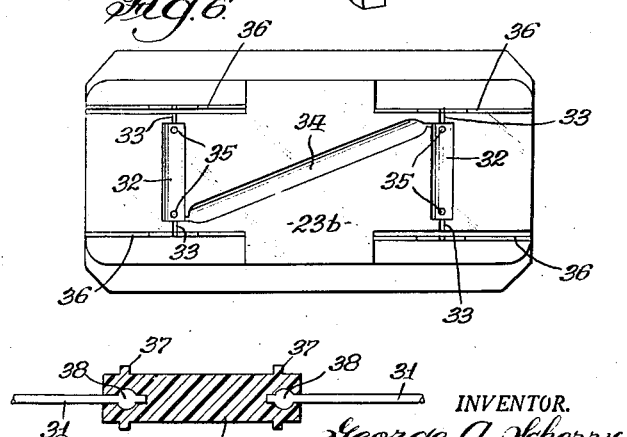
Fig. 6.
Fig. 7.
INVENTOR.
George A. Scherry
BY
Mueller & Aichele
Attys.

Aug. 25, 1959   G. A. SCHERRY   2,900,662
MOLDING MACHINE
Filed Sept. 1, 1955   4 Sheets-Sheet 2

INVENTOR.
George A. Scherry
BY
Mueller & Aichele
Attys.

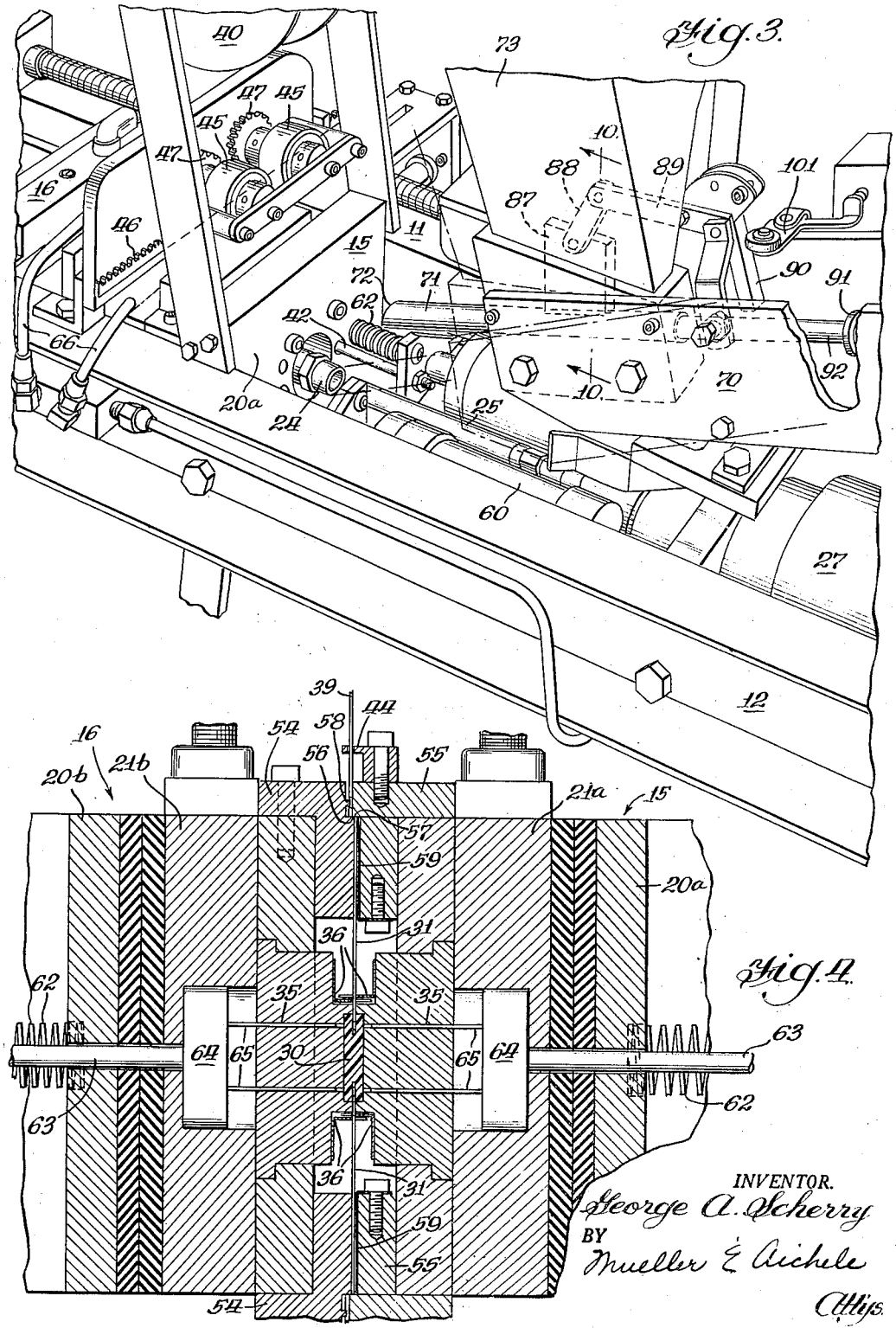

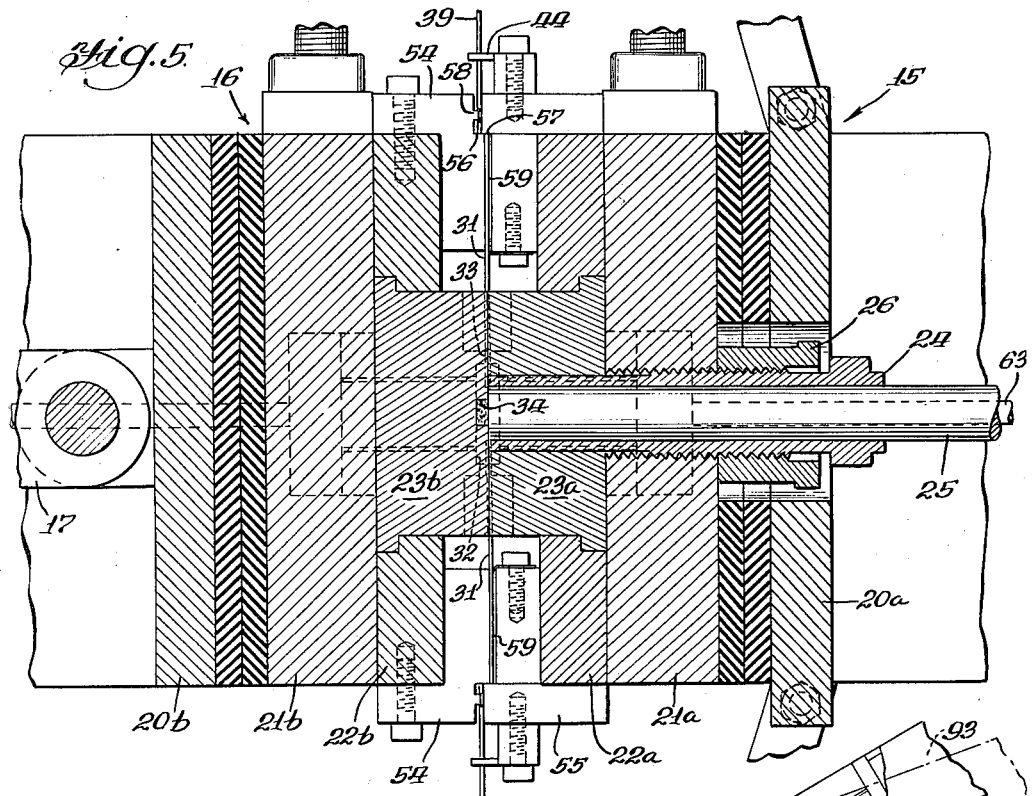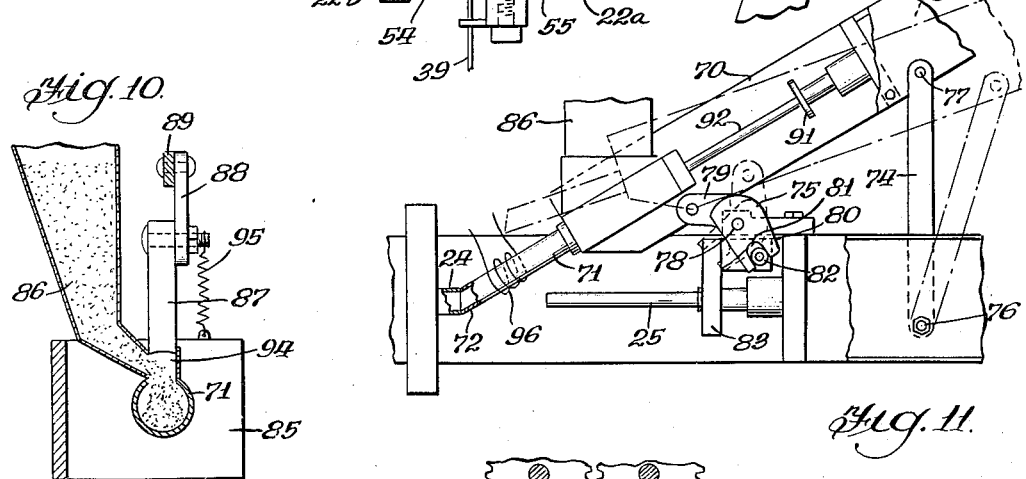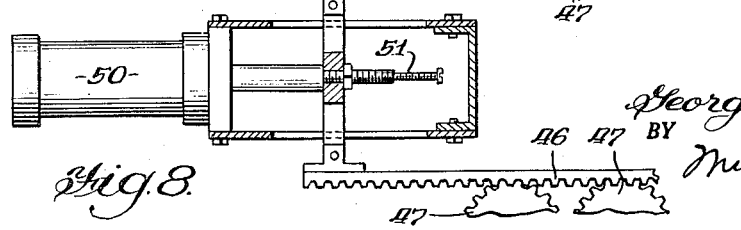

United States Patent Office

2,900,662
Patented Aug. 25, 1959

2,900,662

MOLDING MACHINE

George A. Scherry, Berkeley, Ill., assignor to Grayhill, Chicago, Ill., a partnership consisting of Gordon E. Gray and Ralph Hill Application September 1, 1955, Serial No. 532,033

11 Claims. (Cl. 18—5)

This invention relates generally to plastic molding machines, and more particularly to automatic machines of the horizontal type suitable for molding an object of thermosetting plastic material with an insert imbedded therein.

Because of the very common use of small plastic items there is a great demand for automatic machines for molding the same. Although machines for this purpose are available, most of these machines are very expensive and are practical for use only when very large quantities are required. Further, such machines may not be suitable for use with particular plastic materials which are required in certain applications because of their desired characteristics, such as certain thermosetting plastics which have desired electrical characteristics. Another problem results from the requirement for providing plastic items with an insert imbedded therein such as a plastic coil form having wire terminals extending from the ends thereof. It is desired to provide such an item by a single process with an automatic machine to reduce the cost thereof.

Reference is made to my Patent No. 2,675,583 which discloses and claims an automatic molding machine of the same general type. The present invention is directed to novel features which may be used in a machine of this type to provide machines which are more suitable for molding certain objects.

It is an object of the present invention to provide a simple and improved automatic molding machine of the horizontal type for molding obejcts from thermosetting plastic material.

A further object of the invention is to provide an automatic molding machine for molding objects having inserts therein.

Another object of this invention is to provide a molding machine having a simple and reliable mechanism for feeding plastic material into the machine.

Still another object of this invention is to provide a molding machine having an improved and highly reliable mechanism for removing molded objects therefrom so that the machine can operate repeatedly and automatically without attention.

A feature of the invention is the provision of a molding machine of the horizontal type having fixed and movable mold block assemblies forming a cavity, with a transfer cylinder extending through the fixed mold block assembly into the cavity, and a pivoted breech loading device feeding plastic material into the cylinder when the piston is withdrawn therefrom, the piston thereafter forcing the plastic material through the cylinder into the cavity.

Another feature of the invention is the provision of a horizontal molding machine having fixed and movable molds forming a cavity, with wire feeding apparatus for feeding wires into the cavity to be imbedded into the molded object. The wires may be formed and cut off as the molds move together to close the cavity by means secured to the molds.

A further feature of the invention is the provision of an automatic molding machine having fixed and movable mold block assemblies which provide therebetween one or more cavities, with each mold block assembly having at least one knockout pin extending into the cavity and actuating means therefor which causes the pin to move toward the cavity to free the molded object from the mold, then withdraw from the mold to free the object from the pin, and again extend toward the cavity so that the object falls free. The knockout pin and opening therefor may define a portion of the mold to provide a desired configuration of the molded object.

Still another feature of the invention is the provision of an automatic molding machine wherein the movable mold block, piston, feeding unit and knockout pins are operated by air cylinders or other driving means all controlled by an automatic control system including lockout switches and a timer which provide the desired sequence of operations. A unit for feeding wire inserts into the cavity may be operated by an additional air cylinder and this may also be controlled by the same control system.

Further objects, features, and the attending advantages of the invention will be apparent from a consideration of the following description when taken in connection with the accompanying drawings wherein:

Fig. 1 is a perspective view showing the machine in operative position;

Fig. 3 is a perspective view illustrating the transfer cylinder, piston and plastic feeding arrangement;

Figs. 4 and 5 are cross sectional views through the mold block assemblies;

Fig. 6 shows the mold block and cavity therein;

Fig. 7 shows an object molded in the machine;

Figs. 8 and 9 illustrate details of the mechanism for feeding wires into the mold; and Figs. 10 and 11 illustrate the plastic feeding mechanism.

Figure 2:
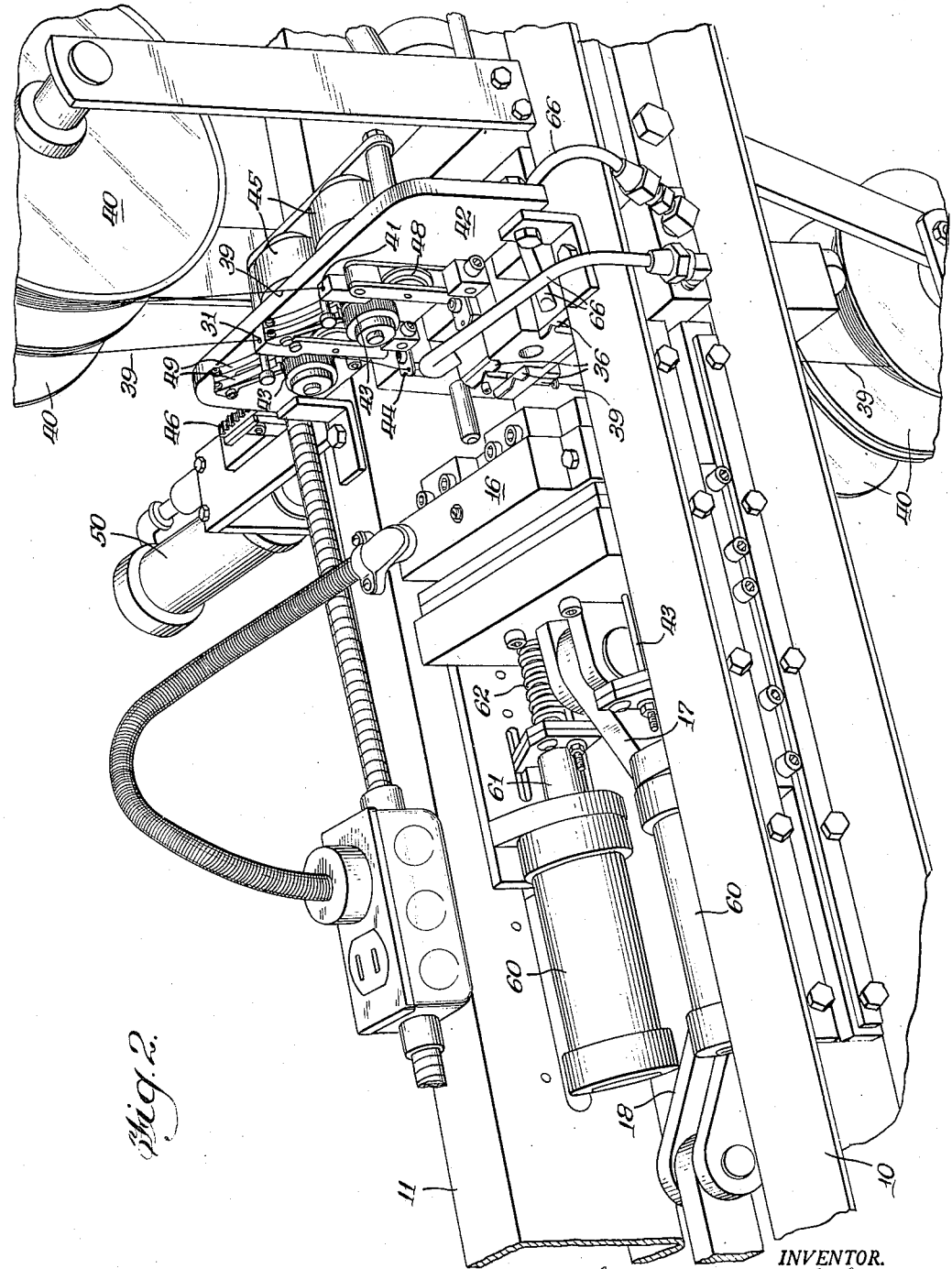
Fig. 2 is a perspective view showing the mold blocks in open position, and the wire feeding arrangement.

In practicing the invention there is provided an automatic molding machine of the horizontal type which is particularly adapted to molding thermosetting plastic material. The machine includes fixed and movable mold block assemblies which comprise platens, heaters, removable mold blocks having recesses to form a cavity in which the plastic material is molded and retainers for holding the mold blocks on the supports in engagement with the heaters. A transfer cylinder extends through the fixed mold block assembly to the parting face of the mold block, and is adjustable on the support to provide accurate alignment as mold blocks are changed. The cylinder is quite short and a breech type feeding device is arranged to pivot so that the outlet thereof is adjacent the cylinder to feed plastic material therein. A transfer piston moves into the cylinder, substantially to the parting face of the mold block, to force the plastic material into the mold cavity. Reels are provided for feeding wire into the cavity to form inserts in the molded object. Dies are provided on the molds which form and cut off the wire as the molds close to provide automatic operation. Knockout pins are provided on each mold block assembly for freeing the molded object from the cavity. The various moving parts of the molding machine are operated by compressed air cylinders or other driving means which are all electrically controlled by interlock switches and a timer to automatically provide the required sequence of operation. Air cylinders are provided to move the movable mold block assembly and the transfer piston, and for operating the devices for feeding the plastic material into the cylinder and for feeding wire into the cavity. Air cylinders are also provided for operating the knockout pins, and these may provide a reciprocating movement to free the molded object from the mold and from the knockout pin and then completely free the object from the machine.

Referring now to the drawings, Fig. 1 shows the overall machine in operating condition. The machine includes a main horizontal frame formed by parallel channel members 10 and 11 which are supported by legs 12 and 13. As best shown in Figs. 2 and 3 a fixed mold block assembly 15 and a movable mold block assembly 16 are supported on the horizontal members 10 and 11. The movable mold block assembly 16 is operated by a toggle linkage including arms 17 and 18 which are operated by an air cylinder 19. This construction is generally similar to that disclosed in my prior patent referred to above. The arm 18 is secured to the frame by a single adjustable screw 14 to permit adjustment so that the mold blocks close as desired. A removable U-shaped sleeve 8 is provided between the air cylinder 19 and the enlarged end 9 of the piston thereof so that the mold blocks are opened a small amount to permit removal of the molded objects, and when the sleeve 8 is removed the air cylinder will open the mold further to permit servicing of the machine. Removal of the sleeve 8 does not affect the normal position of the movable mold block assembly as controlled by the screw 14.

As shown in Figs. 4 and 5, each of the mold block assemblies 15 and 16 includes a supporting platen 20 with a heater 21 attached thereto, and retainers 22 for holding the molds 23 against the heaters. The parts of the fixed mold block assembly are marked 20a etc., and the parts of the movable mold block assembly are marked 20b etc. By this construction efficient heating is provided while at the same time easy change of the molds is permitted as may be required for molding different objects in the same machine. A transfer cylinder 24 extends through the fixed mold block assembly 15 and a piston 25 is mounted for movement in the cylinder 24 to force plastic molding material through the cylinder to the cavity formed by the mold blocks. The cylinder 24 is threaded in the heater 21a to permit adjustment of the position thereof so that the face thereof may be aligned with the parting face of the mold block 23a. Lock nut 26 holds the cylinder in fixed position. The piston 25 is operated by an air cylinder 27 (Fig. 3) which controls the movement of the piston within the cylinder 24.

By way of example, mold blocks 23 illustrated are suitable for molding plastic coil forms having metallic wire terminals extending from the ends thereof. Such a coil form is illustrated in Fig. 7 wherein the plastic body is shown in cross section with wires 31 extending from the ends thereof. The wires include flat portions 38 so that they will be securely anchored in the plastic body. Projections 37 may be provided at the ends of the form to hold a coil in place thereon.

Fig. 6 is a view of the mold block 23b showing the recesses 32 which form the mold cavities for the coil form. The mold block 23a of the fixed mold block assembly will be generally similar to the mold block 23b with corresponding recesses therein. Grooves 33 extend from the recesses 32 to receive the wires 31 as will be more fully explained. The two recesses 32 are connected by a channel 34 which interconnects the cavities to provide a single passage in communication with the transfer cylinder. Openings 35 are provided at the end of the recesses 32 to provide the projections 37 on the coil form and to receive knockout pins as will be described more in detail. Guide members 36 are provided on the molds 23a and 23b and have V-shaped grooves for guiding the wires into the mold. The shape of the guide members is best shown in Fig. 2, and the manner in which they fit together is clear from Fig. 4.

The mechanism for providing wire leads in the molded objects is illustrated in Figs. 1, 2, 8 and 9. Reels 40 are provided above and below the frame members 10 and 11 for feeding wire 39 into the top and bottom sides of the mold. In the machine illustrated, two reels are provided at the top and two at the bottom and this is because two objects are molded simultaneously in the molding machine and each has wires extending from either end thereof. The wires extend down through guide openings 41 in the frame 42 provided above the fixed mold block assembly. The wires are in engagement with feeding wheels 43 and then continued through guides 44 to the guide members 36 on the mold block. The drive wheels 43 are operated through one way clutches 45 which are driven by pinion gears 47 in engagement with racks 46.

Fig. 9 shows the driving structure with the wire 39 being positioned in a groove 52 in the wheel 43 and being forced therein by idler 48. This provides firm frictional engagement. The springs 49 hold the wheel 43 against reverse rotation so that the wire is fed only in one direction. The springs 49 engaging the two rims of the wheel 43 are of slightly different length so that one spring engages and then the other after very small increments of rotation. Similar structures are provided for feeding the wires at the top and bottom of the molds. The racks 46 are driven by an air cylinder 50, with the amount of movement controlling the amount of wire fed. The clutches 45 disengage the drive wheels 43 when the rack is withdrawn. It is to be pointed out that by removing the one way clutches and the springs 49, the wire feeding arrangement may be used to provide pins or cores in the top and bottom of the mold to provide recesses therein. The cores can be withdrawn after the plastic material is set by driving the air cylinder in the opposite direction to that for feeding the cores into the mold, to thereby remove the cores before the mold is opened. The adjustable screw 51 serves as a stop to limit the amount of movement of the piston of the cylinder 50.

As shown in Figs. 4 and 5 dies 54 and 55 for forming and cutting the wires are provided on the mold block assemblies. The engaging edges 56 and 57 of the dies cut the wire at the desired length and the boss 58 forms the wire near the cut end. This provides the flat part 38 on the wire which will be imbedded in the next article molded so that the plastic material will surround the flattened portion and form a secure anchor between the wire and the molded piece. Leaf springs 59 secured to the dies 55 firmly hold the wires 39 in position after the wires are cut.

It is common practice to provide knockout pins or the like for freeing molded objects from cavities in the molds in which they are formed. As previously stated the machine and mold illustrated is constructed to mold two objects simultaneously, one on either side of the transfer cylinder which feeds the molding material into the molds. As best shown in Figs. 2, 3 and 4 a pair of knockout pin assemblies are provided on the movable mold block assembly 16 and a similar pair of knockout pin assemblies are provided on the fixed mold block assembly 15. Each of these assemblies includes an air cylinder 60 having a movable portion 61 which operates against spring 62 to move rod 63 which extends through the platen 20 into the heater 21. A head 64 is provided on the rod 63 having knockout pins 65 extending therefrom. The pins 65 extend through the openings 35 into the mold cavities and these openings may form part of the cavity so that the molding material extends in the openings to provide projections on the molded objects such as projections 37 shown in Fig. 7. Alternatively, the pins can project into the mold to provide a recess in the molded object, or can be flush with the surface of the mold if neither a projection or recess is desired. The air cylinders 60 and springs 62 cooperate to provide a double acting motion so that the knockout pins may be moved in either direction to free the molded objects from the cavity. Air may also be directed toward the mold blocks when open by the tubes 66 to further assure that the molded object is free therefrom.

Pivotally mounted on the main frame of the molding machine is a feeding mechanism 70. As shown in Figs. 1, 3 and 11, the feeding mechanism includes a feeding tube 71 with an outlet 72 through which plastic material in powder or pulverized form is fed to the transfer cylinder 24. The feeding mechanism is mounted for swinging movement, being connected to the frame by arms 74 and 75 (Fig. 11). Arm 74 is connected to the frame at point 76 and to the feeding mechanism at point 77 and pivots about both points. Arm 75 is pivotally connected to the frame at 78 and includes a portion 79 connected to the feeding mechanism 70, and a portion 80 having a U-shaped recess 81 for receiving a roller 82 connected to the transfer piston 25. The portions 79 and 80 may be adjusted with respect to each other to control the movement of the feeding mechanism 70. The roller 82 is supported on a structure 83 which moves with the transfer piston 25. When the piston is withdrawn as is shown in Fig. 11 the feeding mechanism swings down to the position shown in solid lines wherein the outlet of the feeding tube 71 is aligned with the transfer cylinder 24. When the transfer piston 25 moves forward toward the transfer cylinder, the arm 75 pivots to the dotted line position and the feeding mechanism swings upward to the dotted line position.

As shown in Fig. 10 the feeding tube 71 extends through a block 85 which supports the hopper 86 and which includes a slot 94 in which slide 87 operates. Slide 87 is coupled through link 88 to arm 89 adjustably coupled to arm 90 (Fig. 3). Arm 90 is positioned to be engaged by disk 91 secured to the plunger 92 which operates in the feeding tube 71. The plunger 92 is operated by an air cylinder 93 to force plastic material through the feeding tube 71. At the end of the stroke the disk 91 engages the arm 90 to raise the slide 87, so that additional plastic material from the hopper 86 enters the slot 94 under the slide 87. When the piston is withdrawn the spring 95 causes the slide 87 to move downwardly to force this material in the cylinder 71. The plunger 92 does not move to the outlet 72 of the feeding tube, and after each movement one charge of plastic material remains in the feeding tube. This is forced into the transfer cylinder 24 by the next feeding operation. To prevent packing of the material in the feeding tube, the inner diameter may be flared outwardly adjacent the outlet 72 thereof.

A heating coil 96 may be provided about the tube 71 adjacent the outlet 72 thereof to preheat the charge of material remaining therein between feeding operations. It is to be pointed out that this material is not heated sufficiently to cause it to become sticky so that it will not feed easily, but may be preheated sufficiently so that the material cures in the mold in a shorter time to speed up the overall operation of the molding process.

As shown in Fig. 1, a control panel 100 is provided on the side of the molding machine and this is connected in a control circuit for operating a plurality of valves which control the air cylinders. An automatic operating sequence is provided wherein operation of various components trip interlock switches for energizing electrical controls for initiating operation to the components to be operated next. A timer is also provided in the control panel 100 for controlling the time between various operations of the machine.

Considering now the operation of the molding machine, the sequence may be considered to start with the mold open and the transfer piston 25 extending all the way forward. The control circuit when conditioned for providing an automatic cycle of operation first operates valves to provide air to cylinder 27 for withdrawing the transfer piston 25. As previously stated this lowers the feeding mechanism 70 to a position for feeding a charge of plastic material into the transfer cylinder 24. Operation of the cylinder 27 also trips a switch which controls a valve for causing operation of the air cylinder 93 of the feeding mechanism so that the plunger 92 operates to force plastic material through the feeding tube 71 into the transfer cylinder 24, and this same valve also supplies air to the cylinder 50 operating the wire feeding mechanism so that wires are inserted into the mold. The arm 90 of the feeding mechanism operates through linkage 101 at the end of the stroke of cylinder 93 to trip a switch controlling the valve for the main or clamp cylinder 19 of the mold. Accordingly, this cylinder operates to close the mold. The clamp cylinder includes a projecting arm 102 operating cam 103 which engages a plurality of switches in switch box 104. One of these switches is operated as the clamp cylinder closes the mold to operate the valve for cylinder 27 so that the transfer piston 25 forces the material which has been fed into transfer cylinder 24 through this cylinder into the mold cavity. This raises the loader and also operates a switch to return the cylinder 93 of the plastic feeding mechanism and the cylinder 50 of the wire feeding mechanism to their normal positions.

At the same time the transfer piston 25 is operated, a timer in the panel 100 is started to control the timed interval for curing the plastic material which is now in the mold cavity under heat and pressure. At the end of the timed interval, the timer operates the valve to operate cylinder 19 to open the mold. As the movable mold block 16 moves away from the fixed mold block, piston 25 moves forward to eject any material in the transfer cylinder. As the cylinder 19 operates, the cam 103 moved by the piston of this cylinder engages switches in switch box 104 to operate the cylinders 60 which actuate the knockout pins. The cylinders 60 are first operated to force the pins to eject the molded part from the cavity. The cylinders are then released and the springs 62 move the knockout pins to their normal position. Since the ejected part will not return completely into the cavity, the pins will be freed from the molded object. The cylinders are then again operated to discharge the freed molded object from the cavity. The switches in the switch box 104 are arranged to provide this sequence of operation of the knockout pins, and are arranged so that operation takes place only when the cylinder opens the mold and not on the operation causing the mold to close. After the cylinder 19 is completely released and the mold is all the way open the system is in condition for a second operation. The recycling circuit will then cause the system to repeat the operation just described in the event that the recycling circuit is set for continuous operation.

It is therefore seen that an improved automatic molding machine is provided. The machine will mold objects with metallic inserts therein in a completely automatic operation. The overall machine is compact and of relatively inexpensive construction and the molds which must be changed for molding different objects are small and inexpensive. The transfer cylinder is separate from the molds and is adjustable to permit use of molds of different dimensions and to make the dimensions thereof less critical. The breech feeding mechanism isolates the plastic material from the heat of the molds so that it remains in a powder form and feeding thereof is easily accomplished. The knockout system is entirely reliable making it unnecessary to weigh the molded object or otherwise detect that the object is all free of the mold.

It has been found that small plastic objects having inserts therein can be produced at a cost of less than half that of molding the same in machines previously used. Various novel features of the invention may be incorporated in molding machines of other constructions such as the molding machine of my prior patent referred to above.

I claim:

1. An automatic plastic transfer molding machine including in combination, a first fixed mold block assembly having a mold recess, a second movable mold block assembly having a mold recess and adapted to engage said first mold block assembly with said mold recesses mating to provide a closed cavity, said second mold block assembly being movable away from said first mold assembly to open the cavity, a transfer cylinder extending into said first mold block and having an inner end extending to the mold cavity, a piston positioned for movement in said cylinder and adapted to enter the outer end thereof and move substantially to said inner end, movable feeding means for providing plastic molding material in said cylinder including a container for plastic material, a tube having an outlet, a slide for applying a measured amount of material from said container into said tube, and a plunger for moving said material in said tube to said outlet thereof, means coupling said feeding means and said piston for moving the same so that said outlet of said tube is adjacent the outer end of said cylinder as said piston is withdrawn therefrom and moving said feeding means away from the outer end of said cylinder as said piston moves toward said cylinder, and control means having a first control portion for moving said piston out of said cylinder and moving said feeding means to position said outlet adjacent the outer end of said cylinder, a second control portion for moving said second mold block assembly to close the mold, a third control portion moving said slide and said plunger of said feeding means to provide plastic material in said cylinder, said second control portion then moving said piston toward said cylinder and said feeding means away from said cylinder with said piston entering said cylinder to force said plastic material through said cylinder into the closed mold, and said first portion of said control means thereafter operating to move said second mold block assembly to open the mold for removal of the object molded therein.

2. An automatic plastic molding machine of the horizontal type including in combination, a first fixed mold block assembly having a substantially vertical parting face, a second movable mold block assembly having a substantially vertical parting face adapted to engage said parting face of said first mold block assembly to provide a closed mold cavity and being movable away from said parting face of said first mold assembly to open the cavity, a transfer cylinder in communication with said mold cavity having an open end for receiving plastic material to be molded, a piston positioned for movement in said cylinder for forcing plastic material therein into said mold cavity, feeding means including a feeding tube having an outlet for providing plastic molding material in said cylinder, said feeding means being mounted for swinging movement from a first position wherein said outlet of said feeding tube is adjacent said open end of said cylinder to a second position clear of said cylinder so that said piston is movable into said cylinder, said feeding means including a container for holding said plastic molding material, means for providing material from said container into said feeding tube and a plunger for moving material in said feeding tube to said outlet thereof, and means coupling said feeding means and said piston for moving said feeding means to said first position thereof as said piston is withdrawn from said cylinder and moving said feeding means to said second position thereof as said piston moves toward said cylinder.

3. An automatic plastic molding machine of the horizontal type including in combination, a first fixed mold block assembly having a substantially vertical parting face, a second movable mold block assembly having a substantially vertical parting face adapted to engage said parting face of said first mold block assembly to provide a closed mold cavity and being movable away from said parting face of said first mold assembly to open the cavity, a transfer cylinder in communication with said mold cavity having an open end for receiving plastic material to be molded, a piston positioned for movement in said cylinder for forcing plastic material therein into said mold cavity, feeding means including a feeding tube having an outlet for providing plastic molding material in said cylinder, said feeding means being mounted for swinging movement from a first position wherein said feeding means is above said cylinder and said piston to a second position wherein said feeding tube slants downwardly and said outlet thereof is adjacent said open end of said cylinder, said feeding means including a container for holding said plastic molding material, metering means for providing a predetermined amount of material from said container into said feeding tube and a plunger for moving material in said feeding tube toward said outlet thereof with the movement of said plunger stopping short of said outlet whereby one predetermined amount of material remains in said tube between successive operations of said plunger, said feeding tube being flared outwardly adjacent said outlet thereof to facilitate feeding plastic material therein into said open end of said cylinder, means coupling said feeding means and said piston for moving said feeding means to said second position thereof as said piston is withdrawn therefrom and moving said feeding means to said first position thereof as said piston moves toward said cylinder.

4. An automatic plastic molding machine of the horizontal type including in combination, a first fixed mold block assembly having a substantially vertical parting face, a second movable mold block assembly having a substantially vertical parting face adapted to engage said parting face of said first mold block assembly to provide a closed mold cavity and being movable away from said parting face of said first mold assembly to open the cavity, a transfer cylinder in communication with said mold cavity having an open end for receiving plastic material to be molded, a piston positioned for movement in said cylinder, first pneumatic means for moving said piston for forcing plastic material in said cylinder into said mold cavity, movable feeding means for providing plastic molding material in said cylinder, said feeding means including a container for holding said plastic molding material, a feeding tube having an outlet, metering means including a slide for providing a predetermined amount of material from said container into said feeding tube, and a plunger for moving material in said feeding tube toward said outlet thereof, second pneumatic means connected to said plunger and said slide for operating the same, said feeding means being mounted for swinging movement from a first position wherein said outlet of said feeding tube is adjacent said open end of said cylinder to a second position clear of said cylinder so that said piston is movable into said cylinder, means coupling said feeding means and said piston for moving said feeding means to said first position thereof as said piston is withdrawn from said cylinder by said first pneumatic means and moving said feeding means to said second position thereof as said piston moves toward said cylinder, and control means for operating said pneumatic means so that said second pneumatic means feeds plastic material into said cylinder when said first pneumatic means has withdrawn said piston from said cylinder.

5. An automatic plastic molding machine of the horizontal type including in combination, a first fixed mold block assembly having a substantially vertical parting face, a second movable mold block assembly having a substantially vertical parting face adapted to engage said parting face of said first mold block assembly, said first and second mold block assemblies providing a cavity therebetween for molding a plastic object therein with the cavity being closed when said parting faces are in engagement and being open when said second mold assembly is moved, a transfer cylinder connected to said first mold block assembly and communicating with said cavity, feeding means for providing plastic molding material in said cylinder, a piston positioned for movement in said cylinder for forcing said plastic molding material into said cavity, means for inserting a wire into said cavity, means on said mold block assemblies for cutting the wire as said mold block assemblies are moved to close said cavity, and control means for operating said inserting means to place a wire in said cavity, for moving said second mold block assembly to close said cavity and cut off the wire, for operating said feeding means to place plastic material in said cylinder, and for moving said piston in said cylinder to force said plastic material into said cavity and mold the same about said wire.

6. An automatic plastic molding machine of the horizontal type for providing a plastic object having an insert therein including in combination, a first fixed mold block assembly having a substantially vertical parting face, a second movable mold block assembly having a substantially vertical parting face adapted to engage said parting face of said first mold block assembly, said first and second mold block assemblies providing a cavity therebetween for molding a plastic object therein with the cavity being closed when said parting faces are in engagement and being open when said second mold assembly is moved, a transfer cylinder adjustably positioned in said first mold block and having first and second opposite ends with said first end communicating with said cavity and having a face adapted to form a part of said first parting face, a piston positioned for movement in said cylinder and adapted to enter said second end thereof and move substantially to said first end thereof, feeding means for providing plastic molding material in said cylinder, means for placing an insert into said cavity, means on said mold block assemblies for holding the insert as said mold block assemblies are moved to close said cavity, and control means for operating said placing means to place the insert in said cavity, for moving said second mold block assembly to close said cavity, for operating said feeding means to place plastic material in said cylinder, and for moving said piston in said cylinder to force said plastic material into said cavity and mold the same about the insert.

7. An automatic plastic molding machine of the horizontal type including in combination, a first fixed mold block assembly having a substantially vertical parting face, a second movable mold block assembly having a substantially vertical parting face adapted to engage said parting face of said first mold block assembly, said first and second mold assemblies providing a cavity therebetween for molding a plastic object therein with the cavity being closed when said parting faces are in engagement and being open when said second mold assembly is moved, a transfer cylinder connected to said first mold block assembly and communicating with said cavity, feeding means for providing plastic molding material in said cylinder, a piston positioned for movement in said cylinder for forcing said plastic molding material into said cavity, means for inserting a wire into said cavity including a driving wheel having a groove for receiving the wire and an idler wheel for forcing the wire into said groove, one way clutch means for rotating said driving wheel only in the direction for feeding wire into said cavity, said parting faces of said mold blocks having grooves therein to receive the wire, means on said mold block assemblies for guiding, forming and cutting the wire as the mold block assemblies are moved to close said cavity, and control means for operating said inserting means to feed wire in said cavity, for moving said second mold block assembly to close said cavity and to form and cut off the wire, for operating said feeding means to place plastic material in said cylinder, and for moving a said piston in said cylinder to force said plastic material into said cavity and mold the same about said wire.

8. An automatic plastic molding machine of the horizontal type including in combination, a first fixed mold block assembly having a substantially vertical parting face, a second movable mold block assembly having a substantially vertical parting face adapted to engage said parting face of said first mold block assembly, said first and second mold assemblies providing a cavity therebetween for molding a plastic object therein with the cavity being closed when said parting faces are in engagement and being open when said second mold assembly is moved, a transfer cylinder connected to said first mold block assembly and communicating with said cavity, feeding means for providing plastic molding material in said cylinder, a piston positioned for movement in said cylinder for forcing said plastic molding material into said cavity, means for inserting a wire into said cavity, said parting faces of said mold blocks having grooves therein to receive said wire, guide means on said mold block assemblies including overlapping V-shaped portions for guiding the wire into said grooves in said parting faces as the mold block assemblies are moved to close said cavity, and control means for operating said inserting means to feed wire in said cavity, for moving said second mold block assembly to close said cavity, for operating said feeding means to place plastic material in said cylinder, and for moving said piston in said cylinder to force said plastic material into said cavity and mold the same about said wire.

9. An automatic plastic molding machine of the horizontal type including in combination, a first fixed mold block assembly having a substantially vertical parting face, a second movable mold block assembly having a substantially vertical parting face adapted to engage said parting face of said first mold block assembly to provide a closed cavity and being movable away from said parting face of said first mold assembly to open the cavity, said first and second mold block assemblies including heating means for heating said cavity, a transfer cylinder connected to said first mold block and having first and second opposite ends with said first end extending to the mold cavity, a transfer piston positioned for movement in said cylinder and adapted to enter said second end thereof and move substantially to said first end thereof, movable feeding means for providing plastic molding material in said cylinder including a container for plastic material, a feeding tube including a portion extending from said container and having an outlet, a slide for applying a measured amount of material from said container into said feeding tube, and a plunger for moving said material in said tube toward said outlet thereof with one measured amount of material remaining in said portion of said feeding tube adjacent said outlet thereof between successive operations of said plunger, preheating means about said portion of said tube for heating said material therein, and means coupling said feeding means and said piston for moving the same so that said outlet of said tube is adjacent said second end of said cylinder as said piston is withdrawn therefrom and moving said feeding means away from said second end of said cylinder as said piston moves toward said cylinder.

10. An automatic plastic molding machine of the horizontal type including in combination, a frame structure, first and second mold block assemblies having substantially vertical parting faces adapted to be engaged to form a closed mold, means fixedly supporting said first mold block assembly on said frame structure, horizontal means on said frame structure providing a sliding support for said second mold block assembly, with said second mold block assembly being movable from a position in which said parting face thereof engages said parting face of said first mold block assembly to close the mold to a position in which said parting face of said second mold block assembly is spaced from said parting face of said first mold assembly to open the mold, a transfer cylinder connected to said first mold block assembly and providing a passage to the mold when closed, a piston positioned for movement in said cylinder, feeding means for providing plastic molding material in said cylinder, means for moving said second mold block assembly including a toggle linkage having first and second pivoted arms, a single adjustable screw secured to said frame structure and supporting said first arm thereon, said screw providing adjustment of the position of said first arm, said second arm of said toggle linkage being connected to said second mold block assembly, and actuating means coupled to the pivot connection of said arms for operating said toggle linkage to move said second mold block assembly, said actuating means including a cylinder and a piston operating therein, said piston having a part adapted to move toward a part of said cylinder as said actuating means operates said toggle linkage to open the mold, and spacer means adapted to be positioned between said part of said piston and said part of said cylinder to limit the movement of said piston and thereby limit the movement of said second mold block assembly from said first mold block assembly to open the mold a limited amount for removal of molded objects therefrom, said spacer being removable to permit greater movement of said piston and of said second mold block assembly to open the mold a greater amount to facilitate servicing thereof.

11. An automatic plastic molding machine of the horizontal type including in combination, a first fixed mold block assembly including a mold block having a substantially vertical parting face, a second movable mold block assembly including a mold block having a substantially vertical parting face adapted to engage said parting face of said first mold block assembly, said mold blocks providing a cavity therein for molding a plastic object, with the cavity being closed when said parting faces are in engagement and being open when said second mold block assembly is moved, a transfer cylinder connected to said first mold block assembly and communicating with said cavity, feeding means for providing plastic molding material in said cylinder, a transfer piston positioned for movement in said cylinder for forcing said plastic material into said cavity, said mold blocks having openings extending substantially horizontally therethrough, knockout means having elements positioned in said openings in said mold blocks and adapted to move into said cavity as said cavity is opened to engage opposite sides of the molded object to free the same from the mold cavity, said knockout means including actuating means for causing movement of said elements into the cavity and spring means tending to provide movement of said elements out of the cavity, and control means having a first portion for moving said second mold block assembly to close and open said cavity, a second control portion for moving said transfer piston, a third control portion operating said feeding means to feed plastic material into said cylinder, and a fourth control portion for operating said knockout means and including cam and switch means responsive to movement of said second mold block to open the cavity, said cam and switch means including first means for operating said actuating means of said knockout means to move said elements thereof into said cavity, and then releasing said actuating means whereby said springs return said elements of said knockout means, said cam and switch means including second means operating after operation of said first means thereof for operating said actuating means to again move said elements of said knockout means into said cavity, said control means including lockout means and timing means for controlling the sequence of operation of said control portions.

References Cited in the file of this patent

UNITED STATES PATENTS

| | | |
|---|---|---|
| 1,626,118 | Olin et al. | Apr. 26, 1927 |
| 2,113,115 | MacMillin et al. | Apr. 5, 1938 |
| 2,386,891 | Gregory | Oct. 16, 1945 |
| 2,582,891 | Strauss | Jan. 15, 1952 |
| 2,627,086 | Hallenbeck | Feb. 3, 1953 |
| 2,675,583 | Scherry | Apr. 20, 1954 |

FOREIGN PATENTS

| | | |
|---|---|---|
| 528,013 | France | Aug. 6, 1921 |